United States Patent
Alston

[19]

[11] Patent Number: 5,998,882
[45] Date of Patent: Dec. 7, 1999

[54] APPARATUS FOR CONVERTING AIRCRAFT EXHAUST INTO USEFUL ENERGY

[76] Inventor: Jerry L. Alston, 2180 Pepperridge Dr., Augusta, Ga. 30906-5188

[21] Appl. No.: 09/113,530

[22] Filed: Jul. 10, 1998

Related U.S. Application Data

[63] Continuation-in-part of application No. 08/735,534, Oct. 23, 1996, abandoned.

[51] Int. Cl.$^6$ .................................. F03D 9/00; F02C 6/00
[52] U.S. Cl. ............................................. 290/54; 60/226.1
[58] Field of Search .................................. 290/43, 44, 54, 290/55; 60/226.1, 226.3

[56] References Cited

U.S. PATENT DOCUMENTS

| | | | |
|---|---|---|---|
| 4,193,262 | 3/1980 | Snell | 60/261 |
| 4,398,096 | 8/1983 | Faurholtz | 290/55 |
| 4,793,134 | 12/1988 | Coplin et al. | 60/226.1 |
| 4,805,401 | 2/1989 | Thayer et al. | 60/226.2 |
| 5,265,408 | 11/1993 | Sheoran et al. | 60/39.02 |
| 5,512,788 | 4/1996 | Berenda et al. | 290/55 |
| 5,644,170 | 7/1997 | Bynum et al. | 290/43 |
| 5,680,032 | 10/1997 | Pena | 320/61 |

Primary Examiner—Nicholas Ponomarenko

[57] ABSTRACT

An apparatus for capturing the exhaust stream of jet aircraft while it is being readied for takeoff and for converting the energy of this exhaust stream to useful purposes is provided. The apparatus includes a retractable funnel-shaped structure which is positioned at the start of a runway downwind of the site where an aircraft waits for takeoff and, following standard procedure, brings its engines to full power just before the start of the takeoff roll. The funnel-shaped structure, which in use is raised above the surface of the runway, captures a portion of the aircraft exhaust stream and directs it, via a first air duct, into a turbine connected to an electrical generator. Downsteam of the turbine and fluidly connected to the first air duct is a second air duct. Positioned within the latter is an air-to-water heat exchanger used to extract thermal energy from the exhaust stream for the production of hot water. When not in use, the funnel-shaped structure is lowered so that its top is level with the runway surface.

4 Claims, 4 Drawing Sheets

APPARATUS FOR CONVERTING AIRCRAFT EXHAUST INTO USEFUL ENERGY

CROSS-REFERENCE TO RELATED APPLICATION

This application is a continuation-in-part of application Ser. No. 08/735,534, filed Oct. 23, 1996, now abandoned.

BACKGROUND OF THE INVENTION

A system which can use exhausted air flow from one or more ventilation systems to generate electrical power is disclosed by Berenda et al. in U.S. Pat. No. 5,512,788. This system utilizes windmill-type propeller blades to capture the kinetic energy of the exhaust stream.

SUMMARY OF THE INVENTION

The primary object of the present invention is to provide means for capturing jet engine exhaust and converting its kinetic energy to electrical energy for power, said exhaust being captured as the jet engines of an airplane are brought to full power, readying the airplane for takeoff and just before the start of the takeoff roll.

An additional object of this invention is to provide such a jet engine exhaust capturing means for use in heating water.

A further object is, as a byproduct of the capture of the engine exhaust, to reduce airport noise levels.

In accordance with the present invention, there is provided means, including a retractable funnel-like structure placed at the start of a runway near the takeoff position for jet aircraft, for capturing at least part of the exhaust stream emitted by the engines of such aircraft. Also provided, in combination with this exhaust stream capturing means, is a turbine and electrical generator for converting kinetic energy in the exhaust stream to useful energy. The funnel-like structure is fluidly connected to an air duct which defines an interior passageway through which captured engine exhaust is directed into the turbine, and the turbine then drives the generator. Alternating current, produced by the generator, can be utilized directly for lighting or converted, with the use of a diode, to d.c. current and then be utilized to charge batteries for emergency lighting and other purposes.

When an aircraft is not at the start of the runway, the funnel-like structure, which is retractable, is automatically lowered until its top is level with the runway, thereby keeping the structure out of the way of incoming aircraft.

In the preferred embodiment, the combination further comprises an air-to-water heat exchanger which is positioned downstream of the turbine. As exhaust air flow, which is still quite hot, leaves the turbine, the flow passes over the exchanger; and thermal energy in this air flow is captured, producing heated water which can be made available to the airport, nearby businesses and homes.

Another advantage of the present invention is that in the process of capturing the exhaust stream from the jet engines, the funnel-like structure not only directs this stream to the turbine but also acts as an energy absorber, reducing noise. Importantly, this noise reduction occurs as the airplane engines are being brought to full power, just before the start of the takeoff roll, and without any changes in standard procedures for readying an airplane for takeoff.

DETAILED DESCRIPTION OF THE PREFERRED EMBODIMENT

Figure 1:
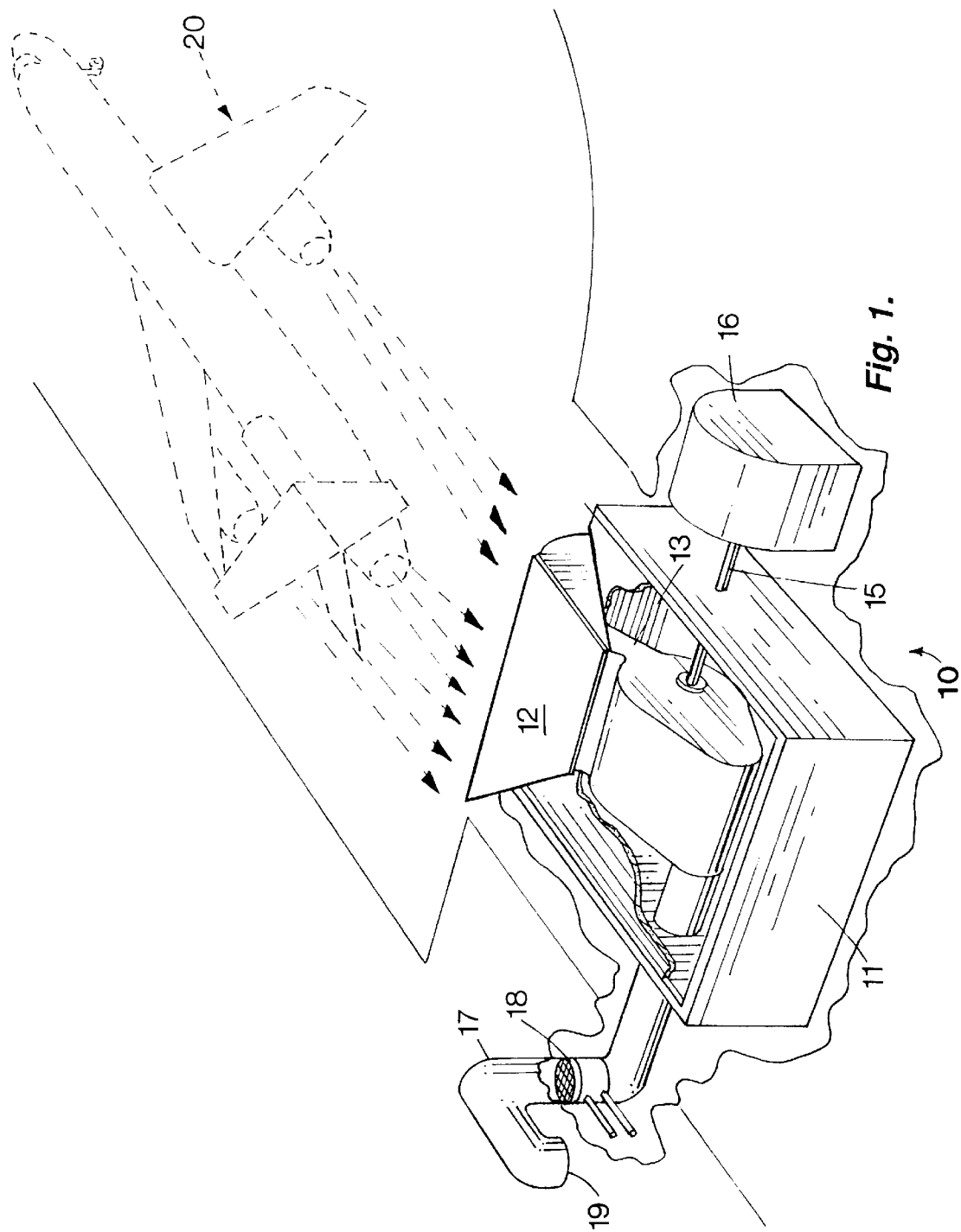
FIG. 1 is a right side perspective view of the combination according to the present invention with a partial breakaway showing components of this combination which are situated below the surface of the runway and in which part of the exhaust stream of the airplane is captured to generate useful energy.
Figure 2:
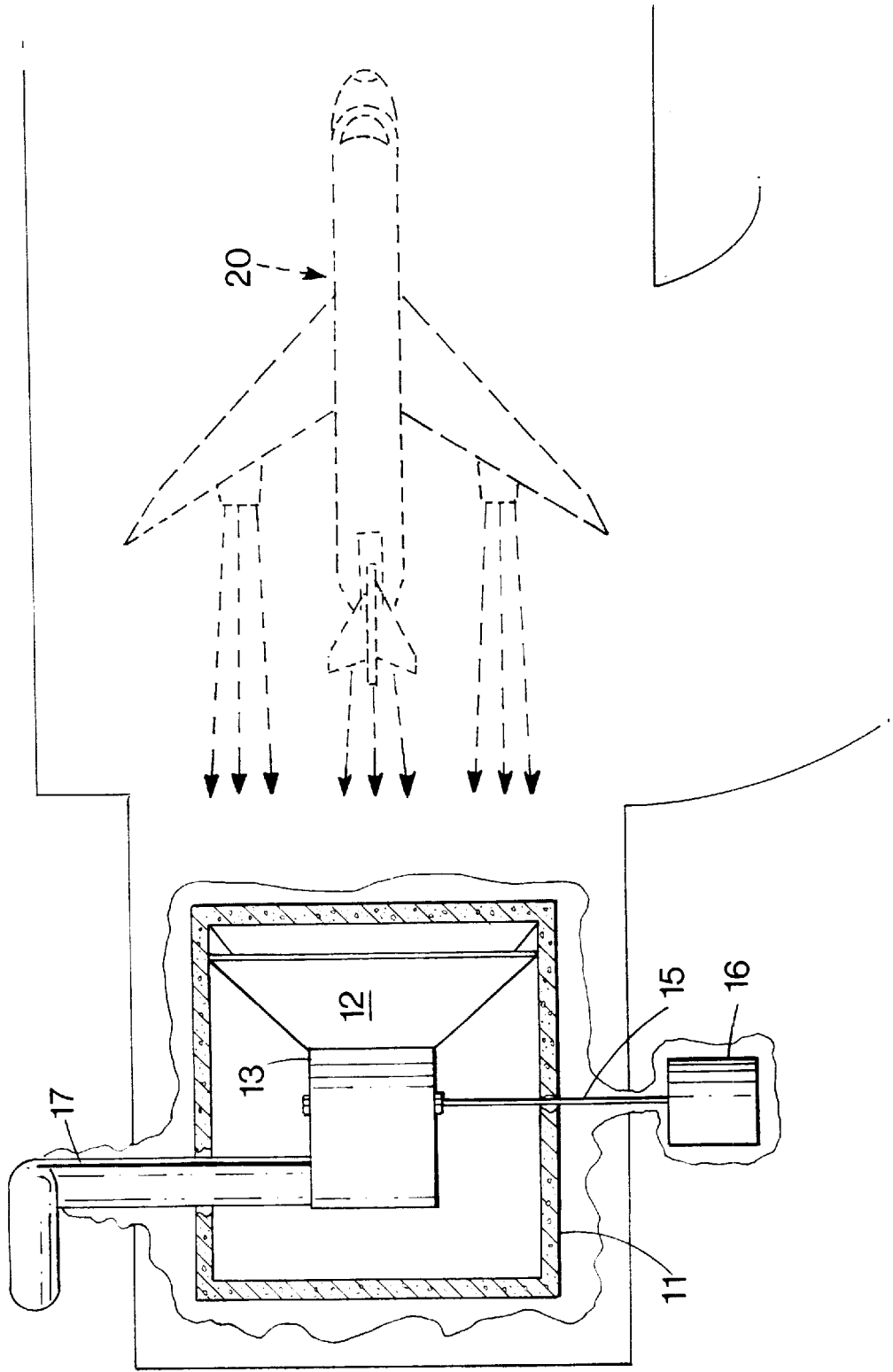
FIG. 2 is a top plan view of the combination according to FIG. 1.
Figure 3:
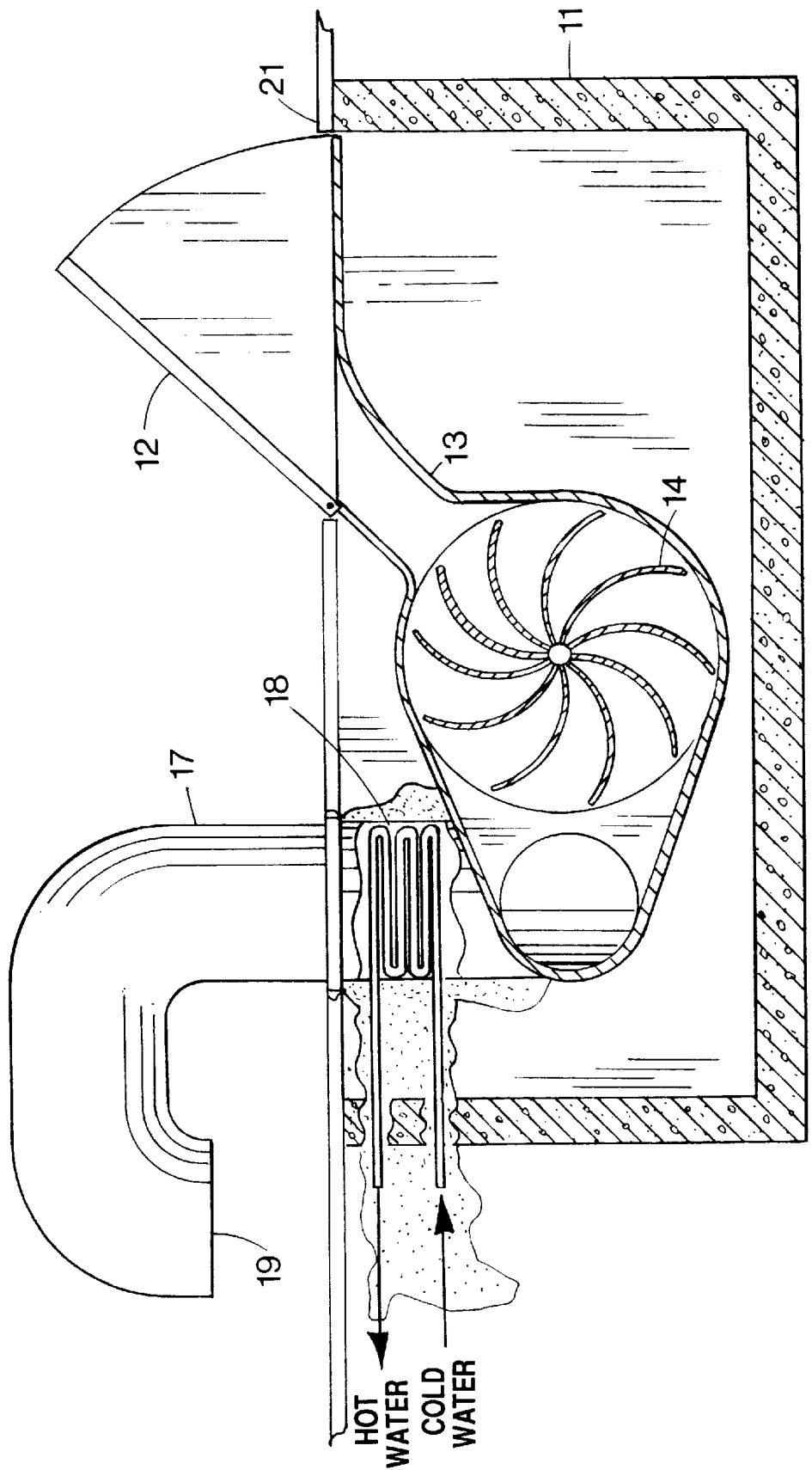
FIG. 3 is a side elevation view on an enlarged scale of portions of the combination according to FIG. 1, in which the turbine and a part of the air ducts fluidly connected thereto being shown in longitudinal cross-section, the retractable funnel-like structure being shown in raised position; and in which a breakaway shows the air-to-water heat exchanger.

Referring to the drawings, an apparatus, which is denoted generally by the reference numeral 10, is fitted into a concrete box 11 built at the start of a runway. The apparatus comprises a retractable funnel-shaped structure with an openable door 12 which serves as a capture funnel for exhaust gases as they stream from an aircraft 20. The exhaust gases captured by this structure are directed, via a first duct 13, into an air turbine 14 with a shaft 15. The shaft 15 is rotatably connected an electrical generator 16. Downstream of the turbine 14, the exhaust gases are discharged through a second duct 17.

Means for recovering additional useful energy from the exhaust gases includes an air-to-water heat exchanger 18 located in the duct 17. Downstream of the duct 17, the spent exhaust gases are released into the atmosphere through an inverted duct exit 19 which forms a rain guard.

Figure 4:
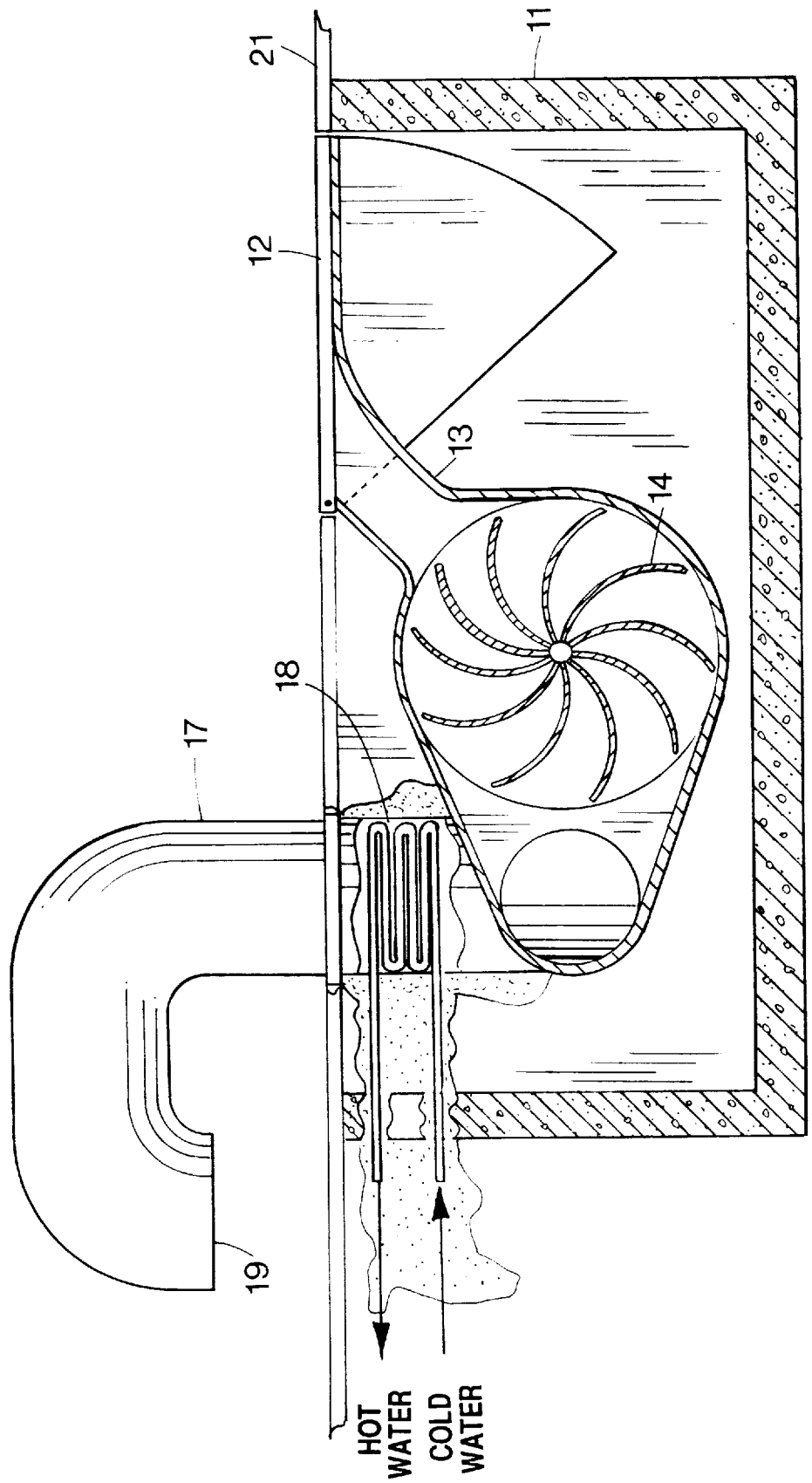
FIG. 4 is a side elevation view according to FIG. 3 except the retractable portion of the funnel-like structure is shown in its lowered position.

When an aircraft is not present at the start of the runway, the door 12 is lowered so that it is flush with the runway surface 21 (FIG. 4). In the preferred embodiment, the door 12 is also kept lowered during major rain storms.

Energy from the generator 16 can be used directly as an a.c. current or converted to d.c. to charge batteries. Hot water produced by the heat exchanger 18 can be used at the airport for deicing the runway and for other purposes.

It is understood that those skilled in the art may conceive other applications, modifications and/or changes in the invention described above. Any such applications, modifications or changes which fall within the purview of the description are intended to be illustrative and not intended to be limitative. The scope of the invention is limited only by the scope of the claims appended hereto.

It is claimed:

1. A means and method for producing useful energy from aircraft exhaust gases comprising:

(a) at least one funnel-shaped structure positioned to capture a portion of the aircraft exhaust gases;

(b) a turbine having blades attached to a common shaft, positioned to receive a stream of aircraft gasses passed through said funnel-shaped structure; and (c) a generator attached to said common shaft for generating electrical energy;

(d) wherein the funnel-shaped structure is retractable when not in use.

2. The means and method for producing useful energy from aircraft exhaust gases, according to claim 1, which further comprises an air-to-water heat exchanger and an air duct fluidly connected to said funnel-shaped structure, said heat exchanger being located in the air duct downstream of the turbine.

3. A means and method for producing electrical energy from an aircraft exhaust stream comprising:
   (a) an air duct having a retractable funnel-shaped structure positioned to capture a portion of the aircraft exhaust stream;
   (b) a turbine having blades attached to a common shaft, positioned to receive said portion of the exhaust stream as it passes through the air duct; and
   (c) a generator attached to said common shaft for generating electrical energy.

4. A means and method for producing useful energy from an aircraft exhaust stream comprising:
   (a) a first air duct having a retractable funnel-shaped structure positioned to capture a portion of the aircraft exhaust stream;
   (b) a turbine having blades attached to a common shaft, positioned to receive said portion of the exhaust stream as it passes through the first air duct;
   (c) a generator attached to said common shaft for generating electrical energy; and
   (d) an air-to-water heat exchanger and a second air duct fluidly connected to the first air duct, said heat exchanger being located in the second air duct downstream of the turbine.

* * * * *